(12) United States Patent
Cook et al.

(10) Patent No.: US 7,559,575 B1
(45) Date of Patent: Jul. 14, 2009

(54) SCHOOL BUS CROSSING GATE AND SYSTEM FOR AUTOMATIC ACTIVATION

(75) Inventors: Anthony J. Cook, Fort Wayne, IN (US); James C. Bradley, New Haven, IN (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 0 days.

(21) Appl. No.: 12/060,955

(22) Filed: Apr. 2, 2008

(51) Int. Cl.
*B60R 21/13* (2006.01)
*B60Q 1/26* (2006.01)

(52) U.S. Cl. .................. 280/756; 180/282; 340/433

(58) Field of Classification Search ............... 280/735, 280/756, 763.1; 180/275, 281, 282; 340/433
See application file for complete search history.

(56) References Cited

U.S. PATENT DOCUMENTS

| | | | | |
|---|---|---|---|---|
| 4,559,518 A | * | 12/1985 | Latta, Jr. .................... 340/433 |
| 5,281,948 A | * | 1/1994 | Estrada ...................... 340/433 |
| 5,355,117 A | * | 10/1994 | Jefferson ................. 340/425.5 |
| 5,406,251 A | * | 4/1995 | Leis ........................... 340/433 |
| 5,781,120 A | | 7/1998 | Kucik |
| 5,847,642 A | * | 12/1998 | Esposito et al. ............. 340/433 |
| 6,238,122 B1 | | 5/2001 | Brooks et al. |
| 6,644,235 B2 | * | 11/2003 | Haynes ..................... 116/28 R |
| 6,753,765 B2 | | 6/2004 | Masuda |
| 7,164,352 B2 | * | 1/2007 | Nelson ....................... 340/472 |
| 2003/0156020 A1 | | 8/2003 | Masuda |
| 2004/0064243 A1 | * | 4/2004 | Nakamura .................. 701/114 |
| 2005/0080550 A1 | * | 4/2005 | Nakamura et al. .......... 701/114 |
| 2008/0208431 A1 | * | 8/2008 | Abraham et al. ............ 701/102 |

* cited by examiner

*Primary Examiner*—Toan C To
(74) *Attorney, Agent, or Firm*—Jeffrey P. Calfa; Mark C. Bach

(57) ABSTRACT

A system for deploying a barrier deterring approach by pedestrians to the exhaust outlet from a vehicle operates in response to exhaust temperature and stopping of the vehicle.

11 Claims, 4 Drawing Sheets

SCHOOL BUS CROSSING GATE AND SYSTEM FOR AUTOMATIC ACTIVATION

BACKGROUND OF THE INVENTION

1. Technical Field

The primary technical field relates to vehicle mounted pedestrian guard barriers, and more particularly to a barrier which automatically deploys to divert foot traffic away from an area adjacent an exhaust pipe.

2. Description of the Problem

Diesel engine equipped vehicles have been the subject of ever more stringent requirements designed to reduce exhaust gas emissions in recent years. These tighter requirements have been directed to reducing particulate emissions among other byproducts of the combustion process. In order to reduce particulate emissions, diesel-engine equipped vehicles have come equipped with diesel exhaust particulate traps, which filter particulate matter from the exhaust stream. These filters are subject to periodic regeneration or after treatment when the build up of matter in the trap begins to unduly restrict the exhaust system. The particulate matter is oxidized in situ, which results in a substantial increase in exhaust gas temperature, potentially as high as 1000 degrees Fahrenheit. Children walking around a school bus to board the bus could inadvertently be exposed to the high temperature exhaust stream. Where buses are waiting at a school to pick up children they are typically parked in close proximity to one another to the point where there is potential for paint damage to the bus directly behind a bus equipped with an active after-treatment system.

SUMMARY

What is provided is a barrier/crossing gate which deploys adjacent the exhaust outlet on a motor vehicle, typically a school bus. The main components of an exemplary embodiment are a controller, the brake system, an exhaust pipe/stack temperature sensor, a rear bumper crossing gate/barrier and a servo system for deploying the barrier. The controller implements an interlock strategy controlling deployment and stowage of the barrier preferably using existing sensors and switches to achieve the desired functionality. When the bus comes to a stop, and the parking brake is engaged, a controller would look up the post-diesel particulate filter exhaust gas temperature as determined by a sensor to see if it exceeds a threshold level. Such sensors are commonly provided with vehicles having diesel particulate sensors. If the temperature is above the threshold level, the controller would command the rear bumper crossing gate/barrier to deploy.

Additional effects, features and advantages will be apparent in the written description that follows.

BRIEF DESCRIPTION OF THE DRAWINGS

The novel features believed characteristic of the disclosure are set forth in the appended claims. The preferred mode of use, further objects and advantages thereof, will best be understood by reference to the following detailed description of an illustrative embodiment when read in conjunction with the accompanying drawings, wherein:

DETAILED DESCRIPTION OF THE INVENTION

Figure 1:
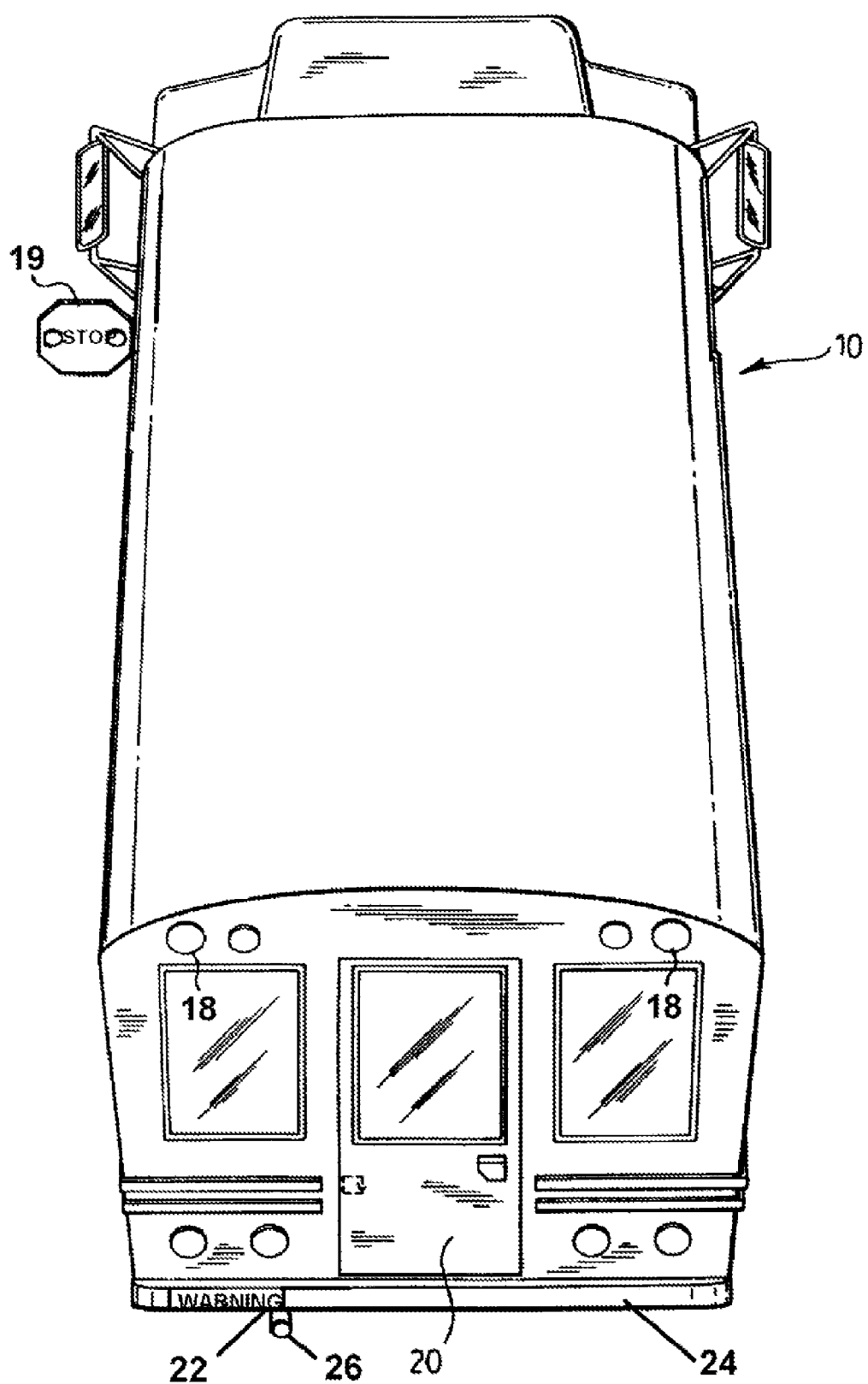
FIG. 1 is an anterior view of a school bus illustrating location of the barrier of the invention.

Referring now to the figures and in particular to FIG. 1, a vehicle such as a school bus 10 is illustrated. School bus 10 is equipped with conventional exterior lamps and warning signs such as pupil warning lights 18 and a deployable stop sign 19. School bus 10 is a diesel powered vehicle having an exhaust pipe 26, which, due to provision for particulate trap regeneration (not shown in FIG. 1) may discharge exhaust from under bumper 24 at elevated temperatures not commonly encountered by pedestrians around vehicles. During regeneration of the exhaust, and at times when pedestrians might be passing by the back of bus 10 a barrier 22 swings out from bumper 24 to give warning to passers by of the possibility of encountering high temperature exhaust gas. The barrier 22 and exhaust 26 are preferably positioned not to interfere with the use of a rear door 20.

Figure 2:
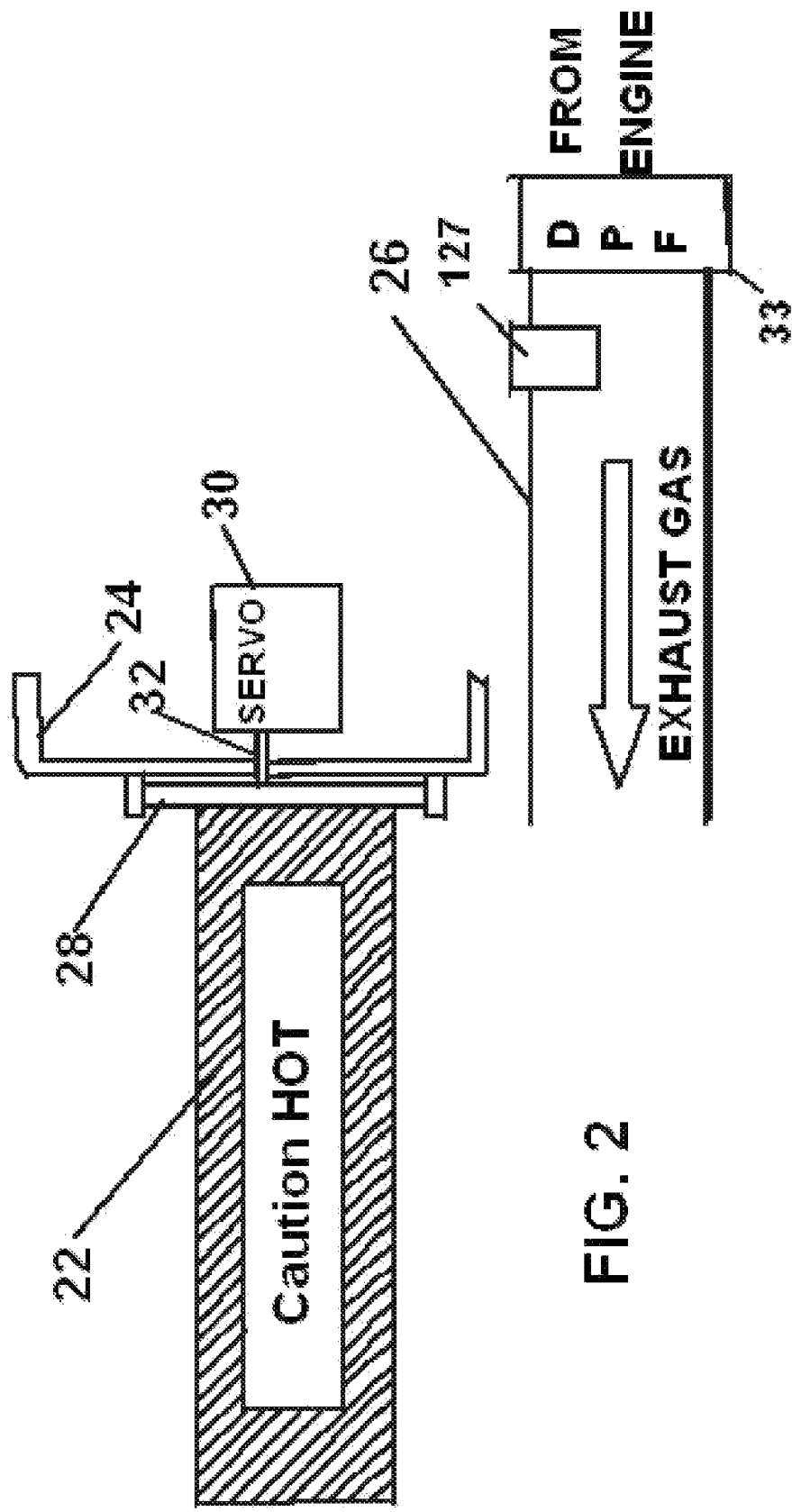
FIG. 2 is a schematic of the barrier and exhaust system.

FIG. 2 illustrates barrier 22 swung outwardly from bumper 24 on a hinge 28 installed on or in the bumper. If desired, a catch (not shown) may be provided to lock the barrier 22 up against the bumper or instead of a section of the bumper. A servo 30 is mechanically coupled to the barrier 22 or hinge 28 to deploy or retract and stow the barrier. A gear and sprocket mechanism 32 linking the servo and hinge 28 conveniently provides for positioning the barrier 28. Hinge 28 is preferably positioned directly above exhaust pipe 26 at its point of discharge so that the barrier 22 is aligned when deployed with the exhaust gas stream leaving the pipe. The system for extension of the barrier is intended as being exemplary only, other methods, such as a hydraulically actuated push rod could be used.

Exhaust gas temperature sensor 127 is located in exhaust pipe 26 downstream from a diesel particulate filter 33. The diesel particulate filter 33 is periodically regenerated raising the temperature of the exhaust gas several hundred degrees Fahrenheit. Exhaust gas temperature is a key trigger in the preferred embodiment for deploying the barrier 22.

Figure 3:
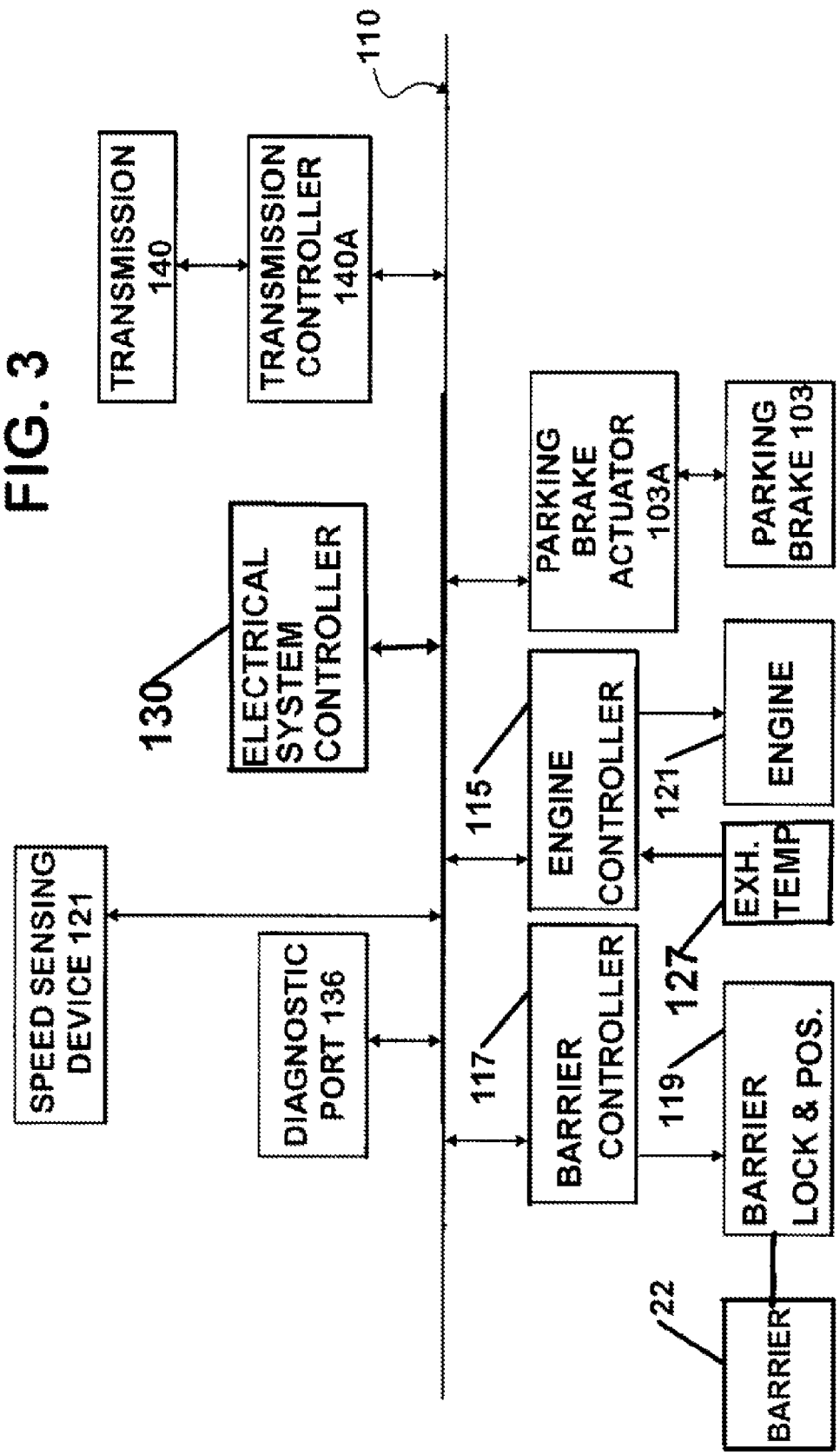
FIG. 3 is a block diagram schematic of a control system for a vehicle providing control over the barrier.

FIG. 3 is a block diagram schematic of a control system for vehicle 10 in so far as it relates to operation of barrier 22. The control system represents a possible control system in which most major functions relating to the invention have been illustrated as located with individual controllers for execution. Those skilled in the art will realize that in many cases a function may be located in a higher level controller, for example the speed sensing function, which is illustrated by a speed sensing device 121, may be implemented by a drive shaft tachometer (not shown) attached to the transmission 140 or drive shaft and monitored by the transmission controller 140A.

The control system includes an electrical system controller (ESC) 130, or equivalent, which may be taken to serve as a supervisory controller over the control system. ESC 130 and other controllers communicate with each over a bus 110, which operates in accord with a protocol such as the Society of Automotive Engineers (SAE) J1939 protocol relating to controller area networks (CAN). The controllers may be dedicated controllers, such as engine controller 115, or they may be generic controllers which are programmed to carry out particular operations or which operate as slaves of the ESC 130. The assignee of this application markets generic controllers for controller area network applications, termed Remote Power Modules, which can be readily programmed from an external diagnostic port 136 or by the electrical system controller 111 in response to particular hardware attached to the remote power module. Barrier 22 may be deployed by a barrier positioning mechanism 119, which may include servo 30 under the control of a barrier controller 117, which may be a remote power module. Typically any function which can be carried out by a generic controller may also be carried out by the electrical system controller (ESC) 130, provided output ports are available for connection of operational hardware to the ESC. Thus the barrier positioning mechanism may be under the direct control for the electrical system controller 130.

In an SAE J1939 CAN context, data buses may be private or public. Data bus 110 may be taken to be a conflation of a public and private bus. A system topology will generally provide that the generic controllers are connected to the private bus and the dedicated controllers are connected to the public bus. The ESC 130 is connected to both buses and acts as a bridge between the buses. The general principal here is that generic controllers are typically used to provide customer specific functions, and use a customized communication set, which is not understandable by the dedicated controllers. This in turn requires the ESC 130 to handle translation between the buses, where required, before data is exchanged between dedicated and generic controllers. The mechanism of such data exchanges is outside the scope of the present invention.

The preferred embodiment of the present invention provides for deployment of the barrier 22 based on an interlock strategy. An interlock strategy using existing sensors and switches can be set up to achieve the desired functionality. When the bus 10 comes to a stop, and the parking brake 103 is engaged, ESC 130 would read the temperature reported by a post-diesel particulate filter temperature sensor 127 to see if it exceeds a threshold level. If the temperature is above the threshold level, the ESC 130 would command the barrier controller 117 to deploy the rear bumper crossing gate/barrier 22. The parking brake 103 is illustrated as connected to a parking brake actuator 103A, however, commonly, parking brake 103 position is reported directly to ESC 130. The exhaust temperature sensor 127 communicates readings to the engine controller 115, which normally executes the steps required to initiate diesel particulate filter regeneration, such as running diesel engine 121 rich to supply fuel and heat to the filter. Setting of the park brake is required in some jurisdictions during embarkation and disembarkation of passengers and thus its use is taken as an indication that passenger boarding operations are occurring. It is possible that other indicators could be used.

Figure 4:
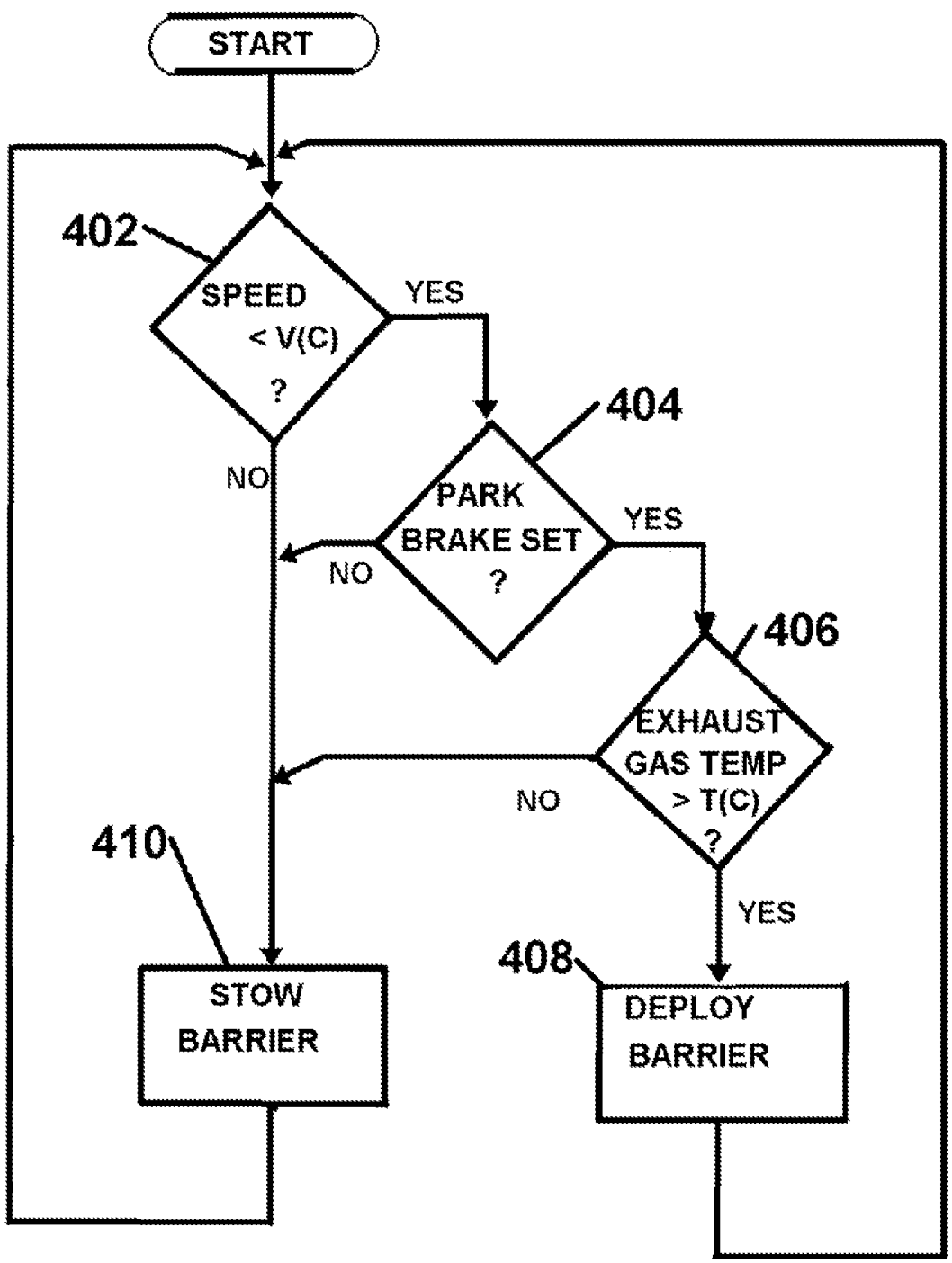
FIG. 4 is a flow chart of the interlock control strategy used to deploy and stow the barrier.

FIG. 4 illustrates implementation of the interlock strategy as a flow chart. The interlock strategy is based on determining that the vehicle is in an operational configuration consistent with the possibility that passengers are disembarking or embarking and that the diesel particulate filter is in fact being regenerated. Absence of any of the three conditions results in stowing the barrier. After starting vehicle speed is checked at step 402 to determine if it falls below a minimum V(C). If it does, the YES branch is taken to step 404 where the position of the park brake is checked. If the park brake is set the YES branch is taken from step 404 to an exhaust gas temperature determination step 406. When exhaust gas temperature downstream from a diesel particulate filter indicates that regeneration of the filter is occurring, the YES branch is taken to step 408 indicating deployment of the barrier 22. The NO branch from any of steps 402, 404, 406 results in restowing of the barrier, if deployed, or confirmation that the barrier is stowed. Following steps 408 and 410 the routine loops back to step 402. All of the interlocks must continue to be satisfied for the barrier to remain deployed.

The rear crossing gate/barrier of the invention deploys as a means to detour children away from the exhaust discharge point while the bus is parked for loading or keep another bus from parking too closely behind. This protects the children and the paint on other vehicles.

The preferred embodiment described here is not intended to limit the scope of the claims, and various changes and modifications can be made thereto without departing from the spirit and scope of those claims.

What is claimed is:

1. A pedestrian barrier system for a motor vehicle having an exhaust outlet comprising:
   a crossing gate installed on the motor vehicle proximate to the exhaust outlet;
   a exhaust gas temperature sensor; and
   a controller coupled to receive a temperature reading from the exhaust gas temperature sensor and responsive the temperature reading exceeding a threshold value and further responsive to a vehicle operational configuration consistent with possible embarkation and disembarkation of passengers for deploying the crossing gate.

2. A pedestrian barrier system according to claim 1, further comprising the controller being responsive to temperature readings below the threshold value or a vehicle operational configuration inconsistent with embarkation and disembarkation of passengers for stowing the crossing gate.

3. A pedestrian barrier system according to claim 2, further comprising:
   a park brake;
   the controller being coupled to receive indication if the park brake is set or not set; and
   the vehicle operational configuration including having the park brake being set as an indication consistent with the embarkation and disembarkation of passengers.

4. A pedestrian barrier system according to claim 3, further comprising:
   a vehicle speed sensor coupled to provide vehicle speed measurements to the controller;
   the vehicle operational configuration consistent with the embarkation and disembarkation of passengers including vehicle speed measurements falling below a maximum allowed speed.

5. A pedestrian barrier system according to claim 4, further comprising:
   a rear bumper;
   the crossing gate being mounted to pivot outwardly along one edge from the rear bumper over the exhaust outlet.

6. A motor vehicle comprising:
   a diesel engine;
   an exhaust pipe from the diesel engine including a diesel particulate filter and a exhaust gas temperature sensor installed to measure exhaust gas temperature downstream from the diesel particulate filter;
   an outlet from the exhaust pipe discharging from under the vehicle;
   a pedestrian barrier attached to the motor vehicle proximate to the outlet and deployable outwardly from the vehicle;
   a speed sensor for reporting vehicle speed;
   a controller coupled to receive reported vehicle speed and the exhaust gas temperature measurements and responsive to vehicle speed being below a maximum and exhaust gas temperature exceeding a minimum level for deploying the pedestrian barrier.

7. A motor vehicle according to claim 6, further comprising:
   a park brake;

the controller being coupled to respond to park brake position, deployment of the pedestrian barrier further requiring the park brake being set.

8. A motor vehicle according to claim 7, further comprising the controller being responsive to absence of any of the conditions required for deploying the pedestrian barrier for stowing the pedestrian barrier.

9. A motor vehicle according to claim 8, further comprising:
- a rear bumper;
- the pedestrian barrier being mounted to pivot outwardly along one edge from the rear bumper over the exhaust outlet.

10. A motor vehicle according to claim 9, further comprising:
- a servo system for positioning the pedestrian barrier.

11. A pedestrian barrier system for a motor vehicle having an exhaust outlet comprising:
- a crossing gate installed on the motor vehicle proximate to the exhaust outlet;
- a controller responsive to a vehicle operational configuration consistent with possible embarkation and disembarkation of passengers for deploying the crossing gate;
- a temperature sensor in the exhaust system of the vehicle; and
- in addition to the vehicle operational configuration, the controller being responsive to temperature readings from the temperature sensor below the threshold value or a vehicle operational configuration inconsistent with embarkation and disembarkation of passengers for stowing the crossing gate and further responsive to temperature readings from the temperature sensor above the threshold value for deploying the crossing gate.

* * * * *